(12) United States Patent
Bodin

(10) Patent No.: US 7,287,053 B2
(45) Date of Patent: Oct. 23, 2007

(54) AD HOC DATA SHARING IN VIRTUAL TEAM ROOMS

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 10/047,123

(22) Filed: Jan. 15, 2002

(65) Prior Publication Data

US 2003/0135576 A1   Jul. 17, 2003

(51) Int. Cl.
G06F 15/16 (2006.01)
G06F 7/00 (2006.01)
G06F 17/30 (2006.01)

(52) U.S. Cl. .......................................... 709/204; 707/10
(58) Field of Classification Search ................ 709/204; 707/10
See application file for complete search history.

(56) References Cited

U.S. PATENT DOCUMENTS

| | | | |
|---|---|---|---|
| 5,138,711 A | 8/1992 | Miyoshi et al. | 713/166 |
| 5,274,757 A | 12/1993 | Miyoshi et al. | 713/166 |
| 5,822,542 A | 10/1998 | Smith et al. | 709/202 |
| 5,845,067 A | 12/1998 | Porter et al. | 713/200 |
| 5,881,442 A | 3/1999 | Hultberg et al. | 713/156 |
| 6,158,010 A | 12/2000 | Moriconi et al. | 713/201 |
| 6,237,099 B1 | 5/2001 | Kurokawa | 713/200 |
| 6,584,493 B1 * | 6/2003 | Butler | 709/204 |
| 6,721,740 B1 * | 4/2004 | Skinner et al. | 707/10 |

OTHER PUBLICATIONS

Kgosiemang, R.T.; "Retrospective Conversion: The Experience at the University of Botswana Library"; Cataloging & Classification Quarterly, vol. 28, No. 3, pp. 67-94; 1999.
Kibbey, M.H.; "MARCON II: Information Control on a Microcomputer"; Library Hi Tech, vol. 4, No. 2; pp. 11-21; Summer 1986.
IBM Dossier = LOT920000022; Method and System for Automatically Accessing, Processing, and Managing the Data in a Place ("PlaceBots"); Feb. 7, 2001.

* cited by examiner

Primary Examiner—George C. Neurauter, Jr.
(74) Attorney, Agent, or Firm—John Biggers; Libby Z. Handelsman; Biggers & Ohanian, LLP

(57) ABSTRACT

A method of ad hoc data sharing for virtual teams rooms, including creating at least one user record representing a user granted access to digital assets, wherein each user has a client device, at least two of the client devices are wirelessly coupled for data communications to at least one computer, and each user record comprises a user access privilege field identifying for each user that user's user access privilege for access to digital assets. Embodiments also include receiving from client devices digital asset records representing digital assets, retrieving digital assets in dependence upon the location fields in the digital asset records, displaying the retrieved digital assets, and editing one or more of the retrieved digital assets, wherein the editing is carried out in dependence upon user access privilege and in dependence upon asset access permission.

50 Claims, 5 Drawing Sheets

User Table

| User ID | User Password | User Access Privilege | Group Membership |
|---|---|---|---|
| MaryJones | | r | 610 |
| JohnBrown | | rw | 616 |
| JaneSmith | | rwx | 614 |

Figure 3

Group Table

| Group ID | Group Access Privilege | Description |
|---|---|---|
| 610 | rwx | Admin Group |
| 612 | rwx | Super User Group |
| 614 | rw | Editor Group |
| 616 | r | Viewer Group |

Figure 4

Digital Asset Table

| Asset ID | Asset Type | Location | Owner's User ID | Access Permission | Relationship |
|---|---|---|---|---|---|
| 402 | HTML | URL 1 | MaryJones | r | 0 |
| 404 | JPEG | URL 2 | MaryJones | rw | 402 |
| 406 | MP3 | URL 3 | JohnBrown | rwx | 402 |
| 408 | JPEG | URL 4 | JohnBrown | r | 406 |
| 410 | TEXT | URL 5 | JaneSmith | r | 0 |
| 412 | TEXT | URL 6 | JaneSmith | rwx | 410 |
| 414 | TEXT | URL 7 | JaneSmith | rwx | 410 |

AD HOC DATA SHARING IN VIRTUAL TEAM ROOMS

BACKGROUND OF THE INVENTION

1. Field of the Invention

The field of the invention is data communications, or, more specifically, methods, Systems, and products for ad hoc data sharing in virtual team rooms.

2. Description of Related Art

"Groupware," sometime called "workgroup productivity software," is class of software that helps groups of colleagues ("workgroups") using client devices, such as workstations or personal computers, attached to a local-area network, organize their activities or perform certain activities together at approximately the same time. Groupware typically supports collaboration among more than one user by providing communications functionality among users. Groupware includes applications that schedule meetings and allocate resources; format, send, receive, and administer e-mail; provide password protection for documents and mutual access to documents; implement telephone utilities; prepare and send electronic newsletters; administer file distribution; and so on.

Groupware can be categorized according to timing of collaboration and according to the physical locations of participants or users. Groupware applications such as voting programs and presentation support generally support synchronous user operations with user client devices 'collated' in approximately the same physical location. Videophones and chat applications support synchronous user operations among user's client devices physically located in many disparate locations. Email and workflow applications support asynchronous user operations across many disparate locations.

A service gateway is an OSGI-compliant host server, server software installed and running on server computer hardware. "OSGI" refers to the Open Services Gateway Initiative, a computing industry organization developing specifications for service gateways, including specifications for delivery of "service bundles." OSGI service bundles are software middleware providing compliant data communications and services through service gateways. The Open Services Gateway specification is a java based application layer framework that gives service providers, network operator device makers, and appliance manufacturer's vendor neutral application and device layer APIs and functions. An "API" is an Application Program Interface, a set of routines, protocols, and tools for building software applications.

A service gateway usually is a home or business server, a separate computer coupled for data communications through a local area network or "LAN" to client devices. Client devices include any device capable of adaptation for data communications, including, for example, automobiles, vending machines, cash registers, gasoline pumps, RFID readers, clocks, window shade controllers, door locks, smoke detectors, proximity detectors, television sets, radios, electric light switches, thermostats, thermometers, air conditioners, heaters, medical monitoring equipment, refrigerators, cook tops on stoves, ovens, coffee makers, water heaters, and so on.

A service gateway usually is an embedded server inserted in a LAN not only for providing data communications among client devices, but also to connect a wide area network or "WAN," such as an external internet or extranet, to internal client devices within a home, office, or business setting. A service gateway often is an embedded server installed and running in the same physical device or cabinet with a client device.

"Embedded server" means a Java embedded server, a small-footprint application server that can be embedded in any networked device, home gateway, or client device. Embedded servers typically are zero-administration devices intended, when implemented as service gateways, to divide a network architecture into an external WAN and an internal LAN. An embedded server manages services deployed from trusted external resources to internal client devices over a network, including for example, services implemented through OSGI-compliant service bundles. Embedded servers enable deployment and installation of services, such as OSGI-compliant service bundles, on a just-in-time basis, when the services are needed from time to time for use by client devices.

All of the technology so described, the groupware, the service gateways, the service bundles, the client devices coupled through a LAN, the service gateway downloading service bundles when needed to provide services through a client device, all of this, has within no provision for synchronous editing of documents across disparate physical locations among multiple users on an hoc basis. More specifically, to the extent that groupware supports synchronous editing, documents other digital asssets subject to editing must be provided to a groupware editing application by document transfers or email ordered more or less manually and asynchronously. Such transfers must be well planned in advance or risk not having available documents useful for a particular collaboration. It would be advantageous for many reasons for users to be able to share documents and other digital assets on an ad hoc basis for synchronous editing from workstations, personal computers, personal digital assistants, or other client devices located in many physical locations.

SUMMARY OF THE INVENTION

Typical embodiments of the invention include a method of ad hoc data sharing including creating at least one user record representing a user granted access to digital assets, wherein each user has a client device, at least two of the client devices are wirelessly coupled for data communications to at least one computer, and each user record comprises a user access privilege field identifying for each user that user's user access privilege for access to digital assets. Some embodiments typically include receiving from client devices digital asset records representing digital assets, each digital asset record including at least one asset access permission field identifying a digital asset's asset access permission, and a location field identifying the location of a digital asset. Other embodiments of the invention typically include retrieving digital assets in dependence upon the location fields in the digital asset records, displaying the retrieved digital assets, and editing one or more of the retrieved digital assets, wherein the editing is carried out in dependence upon user access privilege and in dependence upon asset access permission.

Typical embodiments of the invention include creating a group table, wherein the group table includes at least one group record. In typical embodiments, the group record represents a user group, and the group record includes a group access privilege field and a foreign key field. In typical embodiments, the foreign key field identifies a one-to-many relationship between the group table and one or more related user records in the user table, and the group access privilege field identifies access privileges for users represented by the related user records.

In typical embodiments of the invention, the user access privilege includes a 'read' privilege denoting the right to retrieve a digital asset from a location identified in a digital asset record, a 'write' privilege denoting a right to edit a digital asset, and an 'execute' privilege denoting a right to store a digital asset in a storage location other than the location identified in the digital asset record. In some embodiments, the client devices wirelessly coupled for data communications to the computer typically include the client devices coupled for data communication wirelessly through a service gateway. In some embodiments, the client devices wirelessly coupled for data communications to the computer typically includes client devices coupled for data communications through a Bluetooth piconet. In other embodiments, the client devices wirelessly coupled for data communications to the computer typically includes client devices coupled for data communications through 802.11(b) connections.

In typical embodiments of the invention, each user record includes a user identification field identifying a user represented by a user record, and a user password. In some embodiments, each digital asset record typically includes a digital asset identification field, an owner identification field, and an asset relationship field identifying relationships among digital assets.

Typical embodiments of the invention include receiving from a first client device a first digital asset record representing a first digital asset, the first digital asset record comprising a first asset access permission field identifying a first asset access permission, and receiving from the first client device a second digital asset record representing the first digital asset, the second digital asset record comprising the first asset access permission field identifying a second asset access permission. Some embodiments typically include replacing, promptly after receiving the second digital asset record, the first digital asset record with the second digital asset record, whereby the asset access permission for the digital asset is changed in near real time from the first asset access permission to the second asset access permission.

Typical embodiments of the invention include editing a user access privilege field in a user record, whereby a user's user access privilege is changed in near real time. In some embodiments, the computer is typically located in a first physical location, and the client devices wirelessly coupled for data communications to the computer typically include at least one of the client devices, located in a second physical location, wirelessly coupled for data communications through a second service gateway in the second physical location across an internet to a first service gateway located in the first physical location with the computer. In other embodiments, the steps of creating a user group table and receiving digital asset records are carried out upon a staging computer and the steps of retrieving, displaying, and editing are carried out upon a project computer. Some embodiments typically include displaying on at least one computer display device of the staging computer the retrieved digital assets in their unedited form.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 is a user table illustrating exemplary user record data structures.

FIG. 4 is a group table illustrating exemplary group record data structures.

FIG. 5 is a digital asset table illustrating exemplary data structures for digital asset records.

DETAILED DESCRIPTION OF EXEMPLARY EMBODIMENTS

Introduction

Figure 1:
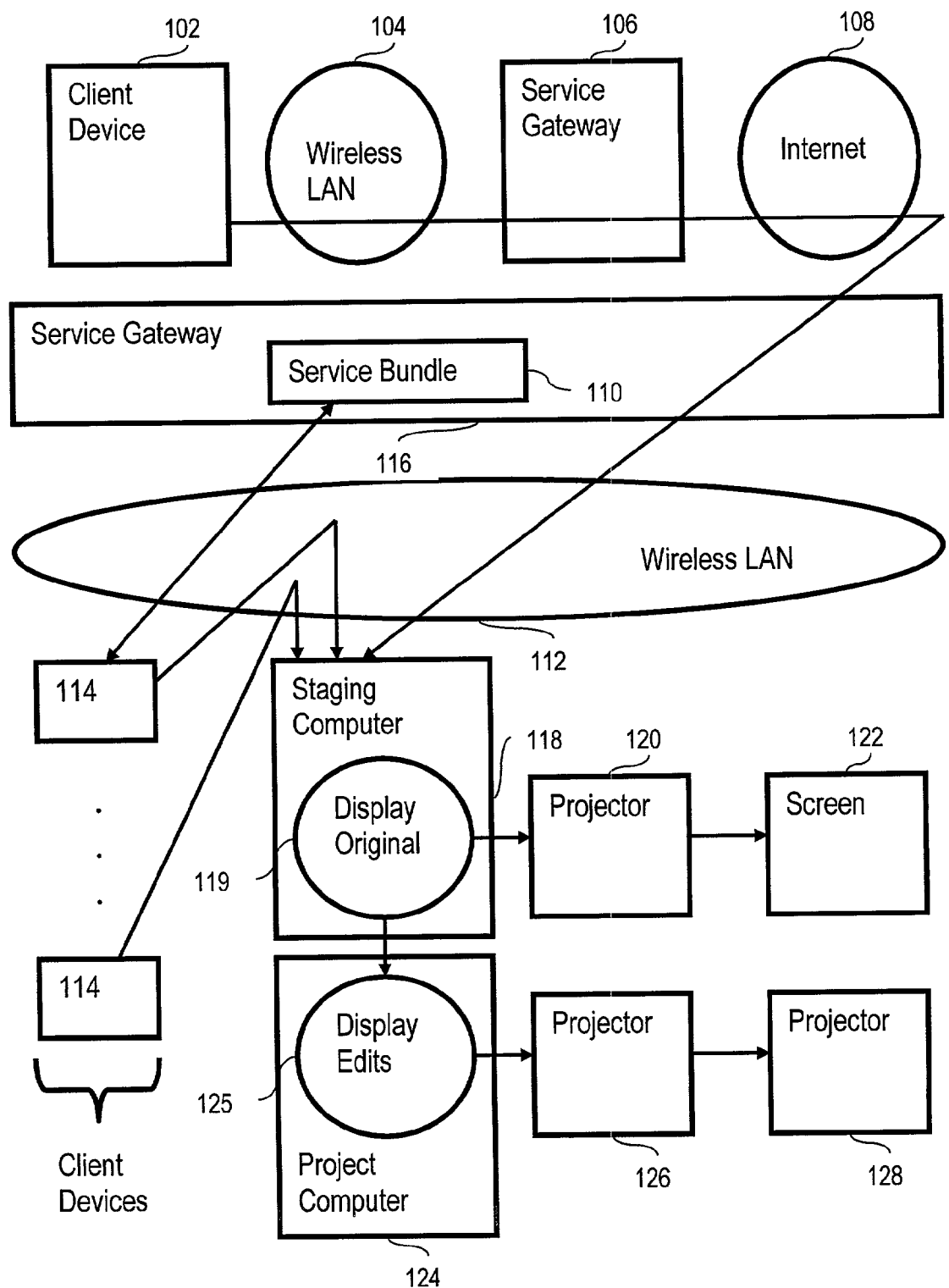
FIG. 1 is a block diagram illustrating typical exemplary embodiments of the invention.

The present invention is described to a large extent in this specification in terms of methods for ad hoc data sharing for virtual team rooms. Persons skilled in the art, however, will recognize that any computer system that includes suitable programming means and suitable communications means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Suitable communications means includes any method of wireless data communications including various infrared and radio means including for example wireless LANs implemented in accordance with IEEE standard number 802.11. Suitable communications means includes any method of wireless data communications including various infrared and radio means including for example so-called Bluetooth piconets implemented in accordance with the well known de facto industry standard known as the "Bluetooth Specification," a specification for short range radio links among mobile personal computers, personal digital assistants, mobile phones, and other portable devices.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Ad hoc," as used in this specification, means organized for a particular purpose with support for improvisation and impromptu action, action prompted by an occasion rather than thoroughly planned in advance.

In this specification, the terms "field," "data element," "attribute," and "code" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, and other forms of data communications as will occur to those of skill in the art. Couplings for data communications include network connections implemented by use of power line protocols such as, for example, "HomePlug," "X-10," "CEBus," and "Lonworks." "Coupled for data communications" includes wireless couplings for data communications. More specifically, "coupled for data communications" includes wireless LAN communications in accordance with IEEE standard 802.11 and also includes wireless radio communication in accordance with the Bluetooth Specification.

"Client device" means any automated computing machinery capable of supporting couplings for data communications useful for ad hoc sharing of digital assets amenable to editing with groupware. Examples of client devices are hand-held personal computers, laptop computers, special purpose devices that are network enabled, internet-capable personal digital assistants, and others that will occur to those of skill in the art. Various embodiments of client devices are capable of wired and/or wireless network access, wired or wireless couplings for data communications. Other client devices will occur to those of skill in the art, and the use as a client device of any instrument capable of transferring digital assets through couplings for data communications is well within the scope of the present invention.

"LAN" means local area network. "Wireless LAN" means a LAN in which one or more client devices are connected to the LAN by use of a wireless connection such as, for example, a Bluetooth connection or an 802.11b connection.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among service gateways, client devices, editing computers, project computers, or staging computers, such as, for example, database management systems comprising digital asset records, is well within the scope of the present invention.

"URL" means Uniform Resource Locator, a standard method of associating network resource locations with network addresses for data communications, and, in the case of servlets, for invoking functions or operations of the resources.

"World Wide Web," or more simply "the Web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such. In this specification, the Web is generally viewed as having the functionality of a WAN connecting service gateways.

"Browser" means a Web browser, a software application for locating and displaying Web pages. Typical browsers today can display text, graphics, audio and video. "WAN" means wide area network.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

Detailed Description

Turning now to FIG. 1, a first example embodiment of the invention is illustrated as a system for ad hoc data sharing of data in virtual team rooms. The term 'virtual team room' is used to emphasize the impromptu nature of the collaboration enabled by use of various embodiments of the present invention. That is, 'virtual team rooms' exist anywhere there that there are computers with client devices coupled through one or more networks as described below in accordance with the invention, with extensions of virtual team rooms present anywhere in the world and even in outer space, so long as, a networked client device is installed upon, for example, the International Space Station. For such an orbital client device, its corresponding project computer in various embodiments is capable of location, again, at any networked location on Earth or in space.

As shown in FIG. 1, typical embodiments include one or more computers (118, 124) for retrieving and editing digital assets. "Digital assets" include any document or computer file capable of embodiment in digital form, including, for example, word processing documents, text documents, HTML documents, XML documents, spreadsheets, JPEG images, MP3 sound clips or music performances, MPEG video tracks, and so on. It is useful to note that digital assets are capable of including other digital assets hierarchically. HTML documents often include URLs referencing JPEG images or MPEG video clips. HTML documents often include URLs referencing other HTML documents containing JPEG images bearing hot spots implementing URLs identifying MPEGs that display video clips in response to invocations of the hot spots through mouseclicks, and so on, and so on, and so on.

Within typical embodiments of the present invention, the hierarchy among digital assets is represented in data structures representing the digital assets, as shown, for example, at reference (454) on FIG. 5. FIG. 5 illustrates an example digital asset table (401) comprising records representing digital assets. Field (454) entitled 'Relationship' describes the hierarchical relationship among digital assets represented in the table (401). In the example of FIG. 5, the value '0' in field (454) is taken to represent no relationship. That is, records bearing '0' in field (454) are related only to themselves, the top nodes in hierarchies.

In the particular example of FIG. 5, an HTML file and a TEXT file, digital assets (402) and (410), are shown as top nodes in hierarchies. A JPEG image and an MP3 file, digital assets (404) and (406) are shown as subobjects within or related to the HTML file, digital asset (402). The JPEG image, digital asset (408), is shown as a subobject of the MP3 file, digital asset (406), which makes it a subsubobject of the HTML file, digital asset (402). The two remaining TEXT files, digital assets (412) and (414), are subobjects of the TEXT file, digital asset (410).

Although only one remote client device (102) coupled remotely through an internet (108) is shown in FIG. 1, in addition to the client devices (114) coupled through a LAN (112) to the computers (118, 124), in fact, the invention contemplates that any number of client devices are connected remotely. In some embodiments, software implementing the methods of the invention is downloaded from OSGI-compliant service gateways (106, 116) to client devices (102, 114) and staging computers (118) or project computers (124) in the form of OSGI-compliant service bundles. Although the computers (118, 124) are shown in FIG. 1 as a separate staging computer (118) and a separate project computer (124), in fact, at least some embodiments implement both staging and project functions on a single computer.

The particular example of FIG. 1 contemplates that a staging computer (118) is used to gather user records, digital asset records, and digital assets, to display the original, unedited form of the digital assets on one display device, and to transfer copies of digital assets to a project computer (124). The editing and display of edited assets (119) is then carried out on the project computer (124). The example display devices shown for both computers in FIG. 1 are projectors (120, 126) and projection screens (122, 128), although the any computer-controllable display devices convenient for viewing by collaborating users is well within the scope of the present invention.

In typical embodiments of the kind illustrated in FIG. 1, the project computer is located in a first physical location, where the client devices wirelessly coupled for data communications to the project computer typically include at least one of the client devices (102), located in a second physical location, wirelessly coupled for data communications (104) through a second service gateway (106) in the second physical location across an internet (108) to a first service gateway (116) located in the first physical location with the project computer. In some embodiments for example, the steps, described in detail below in this specification, of creating a user group table and receiving digital asset records are carried out upon a staging computer (118) and the steps of retrieving, displaying, and editing are carried out upon a project computer (124). Embodiments of the kind using two computers, one for staging and one for editing, further include displaying (119) on at least one computer display device (120, 122) of the staging computer the retrieved digital assets in their original and unedited form. In such embodiments, it is usual for the computer display device of the second computer to be in view of at least two of the users, in support of collaboration. In some embodiments, the computer display devices typically include projectors and projection screens. In other embodiments, the computer display devices comprise video displays. The use of any computer display device useful for viewing and editing digital assets is well within the scope of the invention.

Figure 2:
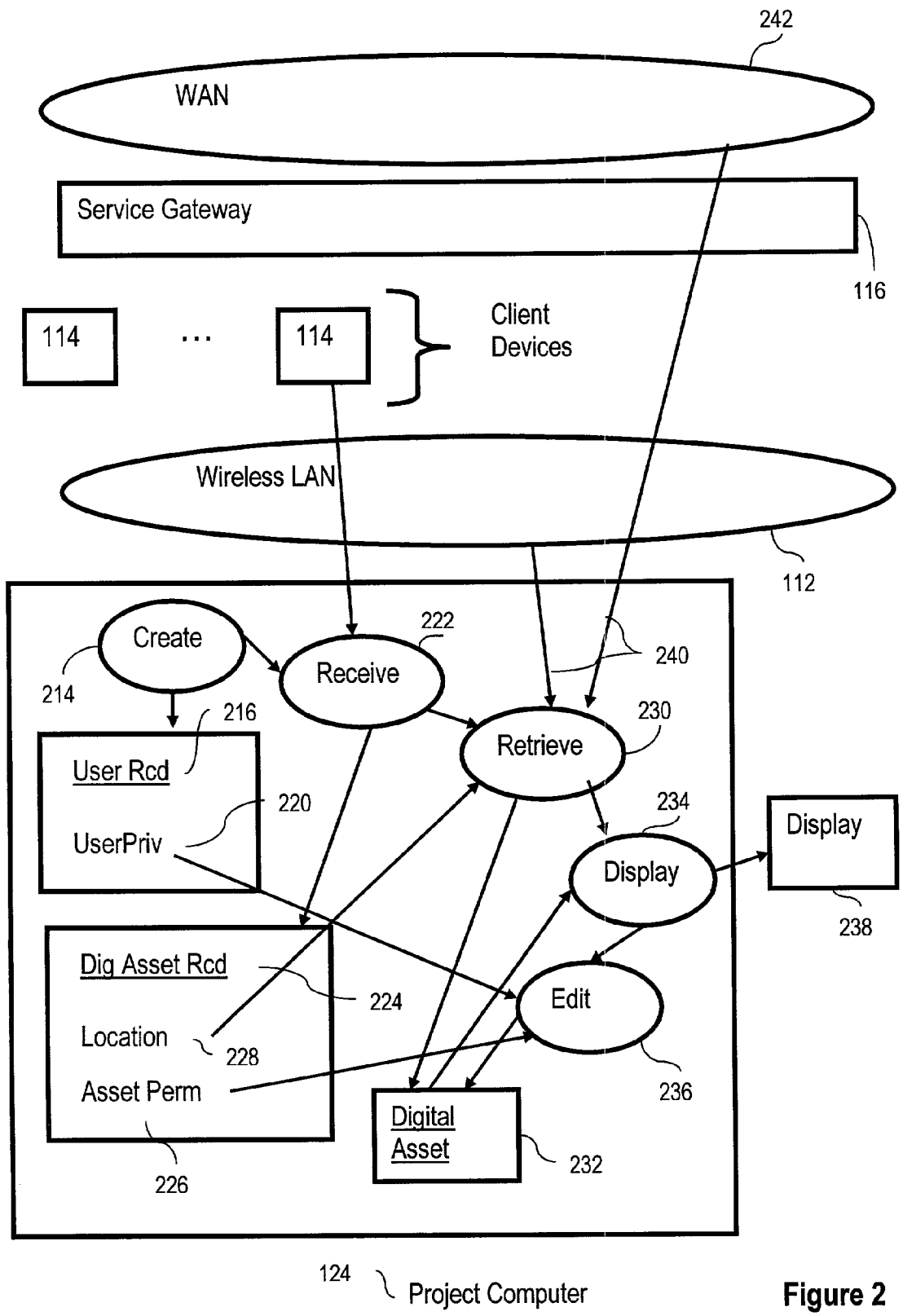
FIG. 2 is a control flow diagram of illustrating typical exemplary embodiments of the invention.

Turning now to FIG. 2, typical embodiments of the invention are seen illustrated as methods of ad hoc data sharing for virtual team rooms. Typical embodiments include creating (214) at least one user record (216) in computer memory in a project computer (124), where each user record represents a user who is ranted access to digital assets. In typical embodiments, each user has a client device (114), and at least two of the client devices are wirelessly coupled for data communications (112) to a project computer. Each user record typically comprises a user access privilege field identifying for each user that user's user access privilege for access to digital assets.

In typical embodiments of the kind illustrated in FIG. 2, as will be explained in even more detail below in this specification, the user access privilege includes a 'read' privilege denoting the right to retrieve a digital asset from a location identified in a digital asset record, a 'write' privilege denoting a right to edit a digital asset, and an 'execute' privilege denoting a right to store a digital asset in a storage location other than the location identified in the digital asset record. In some embodiments, the client devices wirelessly coupled for data communications to the project computer typically include the client devices coupled for data communication wirelessly through a service gateway (116). In some embodiments, the client devices wirelessly coupled for data communications (112) to the project computer typically includes client devices coupled for data communications through a Bluetooth piconet. In other embodiments, the client devices wirelessly coupled for data communications (112) to the project computer include client devices coupled for data communications through 802.11(b) connections.

In typical embodiments of the kind illustrated in FIG. 2, as again will be explained in even more detail below in this specification, each user record includes (as shown in user table (302) in FIG. 3) a user identification field (303) identifying a user represented by a user record, and a user password (304). In typical embodiments each digital asset record includes (as shown in the digital asset table (402) in FIG. 5) a digital asset identification field (218), an owner identification field (451), and an asset relationship field (454) identifying relationships among digital assets.

Typical exemplary embodiments include receiving (222), in a project computer (124) from client devices (114), digital asset records (224) representing digital assets. In typical embodiments each digital asset record includes at least one asset access permission field (226) identifying a digital asset's asset access permission, and a location field (228) identifying the location of a digital asset. The location of a digital asset is typically implemented as a URL identifying a location, wherein the location is any storage location on any networked computer system anywhere in the world or in space. More specifically, although the URL identifying the location typically is implemented as a value of a field in a digital asset record, the location so identified is not in the digital asset record nor is it necessarily even in the client device that provided the digital asset record. It would be very common, for example, for the digital asset record to come to a project computer in a remote virtual team room from a user's client device that is the user's personal digital assistant when the digital asset identified by the digital asset record is physically located, and so located through a URL, on a document server in a corporate computer system, remote from the virtual team room, in a corporate office where the user is employed. The location of the digital asset is anywhere in cyberspace capable of identification in a URL, which is to say, more or less, anywhere in cyberspace, a very great range of locations indeed, a far greater range of locations that is available on any personal digital assistant or any portable computer.

Embodiments typically include retrieving (230), into a project computer (124), in dependence upon location fields (228) in digital asset records (224), digital assets (232), displaying (234) on at least one computer display device (238) of the project computer the retrieved digital assets (232), where the computer display device is in view of at least two of the users, and editing (236), through the project computer (124), one or more of the retrieved digital assets (232), where the editing (236) is carried out in dependence upon user access privilege (220) and in dependence upon asset access permission (226).

Relations among user access privileges and asset access permissions are further explained by use of FIG. 3 and FIG. 5. FIG. 3 shows a user table (302) comprising user records (306, 308, 310) each of which is a data representation of a user. The user records in this particular example include a field for a user identification (303), a field for a user password (304), a field identifying user access privilege (220), and a group membership field (306). FIG. 5 shows a digital asset table (401) comprising digital asset records (402-414), where each digital asset record comprises a digital asset identification field (218), an asset type field (456), a location field (450), an owner identification field (451), an access permission field (452), and a relationship field (454).

In this example, each user represented by a user record is granted user access privileges as described in a user record representing the user. User access privileges so granted are specified in a user access privilege field (220) in the user access record. The user access privileges in the examples illustrated in FIG. 3 are 'r' for a read privilege, 'w' for a write privilege, and 'x' for an execute privilege.

Readers skilled in Unix will recognize the similarity of this example system to file access permissions in Unix. Indeed, as used in this example, the read and write privileges have a similar meaning as in Unix, although the execute privilege is defined a little differently from Unix. In Unix, 'x' for execute usually represents permission to execute an executable file. In this example, 'x' for execute means permission to copy a digital asset and move and save the copy in a location other then the location identified in the location field (450) of a digital asset record.

The user 'MaryJones' identified in user record (306) on FIG. 3 has user access privilege of 'r,' meaning a right to read and view digital assets, but no right to change or edit them. The user 'JohnBrown' identified in user record (308) has user access privilege of 'rw,' meaning a right to edit digital assets in addition to reading and viewing them. The user access privilege 'rw' carries with it in this example no right to transfer to or save assets in locations other than the location set forth in the location field (450) in an asset's digital asset record. The user 'JaneSmith' identified in user record (310) has user acess privilege of 'rwx,' meaning a right to copy, transfer, and save in other locations the digital assets themselves in addition to the rights to edit, read, and view digital assets.

In contrasting the 'rw' and the 'rwx' permissions, it is useful to remember that the digital assets themselves are located at any location in cyberspace identifiable with a URL. In many application, the owner of an asset may grant to other users the right to read or even edit an asset without granting the right to move the asset around in cyberspace. Of course viewing and editing require some motion of an asset, but digital assets are viewed and edited without being saved in locations other than the location specified in a digital asset record. Digital assets are viewed and edited under 'rw' permissions and then returned in edited form, for example, to the location specified in a digital asset record without being saved in nonvolatile memory in any location other then the specified location.

Figure 6:
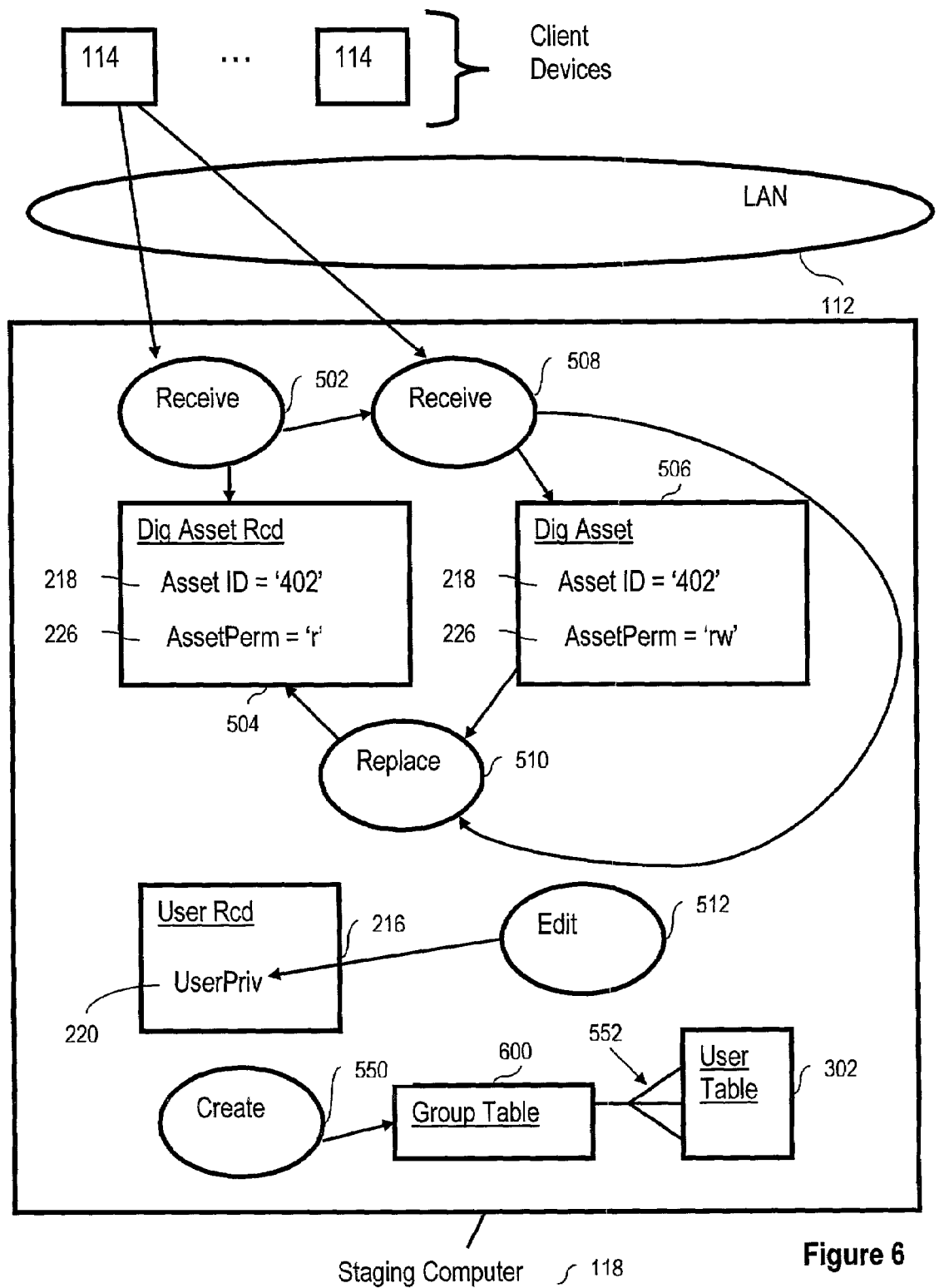
FIG. 6 is a control flow diagram illustrating additional exemplary embodiments of the invention.

As shown in FIG. 6, typical embodiments of the invention include creating (550) a group table (600), where the group table includes at least one group record having the data structure shown in FIG. 4. In typical embodiments, a group record represents a user group, and a group record includes a group access privilege field (604 on FIG. 4) and a foreign key field (602 on FIG. 4). In many embodiments, the foreign key field (602) identifies a one-to-many relationship (552 on FIG. 6) between the group table (600) and one or more related user records in the user table (302), and the soup access privilege field (604 on FIG. 4) identifies access privileges for users represented by the related user records.

In many embodiments, the group access privileges have priority over user access privileges. For example, in such embodiments, the fact that the user 'MaryJones' identified in user record (306) is granted user access privilege of 'r' in the user record is overridden by the fact that 'MaryJones' has group membership (306) of '610.' Group (610), as shown in FIG. 4, has group access privilege of 'rwx,' which means by implication that 'MaryJones' has an access privilege of 'rwx' despite the fact that her user record denotes a user access privilege (220) of 'rw.'

In many embodiments, user access privileges override access permissions. For example, in such embodiments, the fact that the HTML document, digital asset (402) in FIG. 5, has an asset access permission (452) set to 'r,' is overridden by the fact that the user 'JaneSmith' identified in user record (310) in FIG. 3 has user access privilege of 'rwx.' In this example, 'JaneSmith' can read, write, and execute (as "execute" is defined in this context) the HTML document represented by digital asset record (402 on FIG. 5) regardless of the fact that the access permission (452) on the digital asset record is set to 'r.'

Turning now to FIG. 6, a further exemplary embodiment of the invention is shown to include receiving (502) from a first client device a first digital asset record (504) representing a first digital asset, the first digital asset record comprising a first asset access permission field (226) identifying a first asset access permission, and receiving (508) from the first client device a second digital asset record (508) representing the first digital asset, the second digital asset record comprising the first asset access permission field (226) identifying a second asset access permission. Many embodiments typically include replacing (510), promptly after receiving the second digital asset record, the first digital asset record (504) with the second digital asset record (506), whereby the asset access permission for the digital asset is changed in near real time from the first asset access permission to the second asset access permission. Other embodiments of the invention typically include editing (512) a user access privilege field (220) in a user record (216), whereby a user's user access privilege is changed in near real time. In this specification, the term "near real time" means that an even occurs promptly, or almost immediately, from the perspective of a human being.

For a further explanation of changing privileges or permissions in near real time, consider an example in which a user brings to a conference room the user's personal digital assistant ("PDA") having installed upon it a data communications software program in accordance with the present invention. The PDA is Bluetooth enabled, and the conference room includes a Bluetooth piconet implemented in OSGI-compliant service bundle on an OSGI-compliant service gateway.

When the PDA's Bluetooth installation senses the gateway, the PDA promptly uploads to a staging computer a set of digital asset record identifying digital assets stored at locations on the PDA as identified by URLs in the location fields in the digital asset records. The staging computer uses the URLs to retrieve the digital assets for editing. All of the digital assets have access permission of 'rw,' meaning that none of them are authorized for retention on other systems. There are other collaborative users in the conference room participating in a groupware editing session. No user has 'rwx' privileges.

The effect of all this is that the user is physically carrying with him on his PDA his digital assets and without further intervention from him, his digital assets may not be saved in locations other then on his PDA in the locations identified in the URLs. If the user stands up and leaves the room carrying his PDA with him out of Bluetooth range, the user's digital assets go with him. The digital assets may still be viewable and editable on a project computer, but they cannot be saved on the project computer. They cannot be saved anywhere but on the PDA, which is to say that they cannot be saved at all if the PDA is taken out of Bluetooth range.

Now consider that the user wishes to leave the meeting before collaborative editing is finished. The user in effect changes his mind. Rather than requiring his digital assets absolutely to be returned to his PDA, he decides to allow their being saved on the project computer. The user edits on his PDA the digital asset records representing the digital assets, changes the access permissions to 'rwx,' and then uploads the digital asset records as changed to the staging computer, through the staging computer to the project computer, where the digital asset records as changed replace their predecessors. Now when the user takes his PDA out of Bluetooth range, other collaborative users can continue to edit the user's digital assets and save them in edited form in nonvolatile computer storage on the project computer.

In the use case described just above, all the digital assets under edit were on a user's PDA. Consider a second example use case, similar to the first one above, in which a user's digital assets are all located, not on the user's PDA, but on a document server coupled through a LAN to the service gateway and through the service gateway to the Bluetooth piconet in the conference room. Now when the user picks up his PDA and leaves the conference room, leaving Bluetooth range, the other collaborative user can continue to edit his digital assets and save them in edited form back across the piconet, though the service gateway, and across the LAN to the storage locations identified by the URLs in the digital asset records. The digital asset records came from the PDA through the Bluetooth piconet, but once the staging computer or the project computer has the digital asset records and their corresponding digital assets in volatile memory, the user can remove the PDA with no effect on the ability of the other collaborative users to save the digital assets as edited back into their original locations as permitted merely by 'rw' user privileges and asset permissions. The user can leave the meeting confident that regardless of how extensively his digital assets are edited, no copies of them will be retained in other locations.

Readers by see that the variety of use cases for the present invention is very large.

Consider by way of further explanation a third and final use case in which several users have a collaborative conference in a virtual team room comprising a conference room in Houston and a conference room in Singapore.

The users in Singapore have as client devices PDAs coupled through a Bluetooth piconet to a service gateway and a project computer programmed to display edits effected in Houston. The Singapore service gateway is coupled through a WAN, such as the Internet, to a service gateway in Houston and then to a Bluetooth piconet in the Houston conference room to which is coupled a second project computer programmed to edit digital assets. Houston users have PDAs coupled through the Houston Bluetooth piconet to the Houston service gateway and to the Houston project computer.

The collaborative project comprised of digital assets is well begun. The users have previously collaborated on the same subject or a similar subject. All of the users before entering their respective conference rooms have entered into their PDAs digital asset records identifying and locating through URLs digital assets located on various computers coupled for data communications through LANs or WANs to the Houston project computer.

As soon as the users enter their respective conference rooms and come into radio range of the Bluetooth piconet their digital asset records are uploaded to the Houston project computer and then the digital assets identified and located through the digital asset records are similarly uploaded. The conference rooms are connected by video conferencing. The users speak to one another, from Houston to Singapore and back via video conferencing, regarding how to implement their project. The digital assets are edited in the Houston project computer in accordance with the users' discussions. The digital assets as edited are displayed on projectors in the conference rooms Singapore and in Houston.

In accordance with the present invention, the security access privileges and permissions for access to digital assets and for storage locations of digital assets are in complete, near real time control of the users. Authorized storage locations and access authorizations, privileges and permissions, are granted, retracted, or changed in near real time with just a few keystrokes. The mass of digital assets, HTML documents, digital images, video or audio clips, and so on, available for editing is extremely large, capable of location anywhere in cyberspace, and accessible and editable with a keystroke or a mouseclick. Any user can add an asset to the collaboration at any time merely by typing in a new digital asset record and uploading the new record to a project computer. And here is the point of this third use case: all this power and flexibility is brought to bear merely by the users' walking with client devices into a conference room or rooms supporting wireless couplings for data communications with one or more project computers programmed in accordance with the present invention.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A method of ad hoc data sharing, the method comprising the steps of:
creating at least one user record representing a user granted access to digital assets, wherein:
each user has a client device,
at least two of the client devices are wirelessly coupled for data communications to at least one computer, and each user record comprises a user access privilege field identifying for each user that user's user access privilege for access to digital assets;

receiving from client devices digital asset records representing digital assets, each digital asset record comprising:
- at least one asset access permission field identifying a digital asset's asset access permission, and
- a location field identifying the location of a digital asset;

retrieving digital assets in dependence upon the location fields in the digital asset records;

displaying the retrieved digital assets; and editing one or more of the retrieved digital assets, wherein the editing is carried out in dependence upon user access privilege and in dependence upon asset access permission.

2. The method of claim 1 further comprising creating a group table, wherein the group table comprises at least one group record, the group record representing a user group, the group record comprising a group access privilege field and a foreign key field, wherein the foreign key field identifies a one-to-many relationship between the group table and one or more related user records in the user table, wherein the group access privilege field identifies access privileges for users represented by the related user records.

3. The method of claim 1 wherein the user access privilege comprises:
- a 'read' privilege denoting the right to retrieve a digital asset from a location identified in a digital asset record,
- a 'write' privilege denoting a right to edit a digital asset, and
- an 'execute' privilege denoting a right to store a digital asset in a storage location other than the location identified in the digital asset record.

4. The method of claim 1 wherein the client devices wirelessly coupled for data communications to the computer further comprise the client devices coupled for data communication wirelessly through a service gateway.

5. The method of claim 1 wherein the client devices wirelessly coupled for data communications to the computer comprises client devices coupled for data communications through a Bluetooth piconet.

6. The method of claim 1 wherein the client devices wirelessly coupled for data communications to the computer comprises client devices coupled for data communications through 802.11(b) connections.

7. The method of claim 1 wherein each user record further comprises:
- a user identification field identifying a user represented by a user record, and
- a user password.

8. The method of claim 1 wherein each digital asset record further comprises:
- a digital asset identification field,
- an owner identification field, and
- an asset relationship field identifying relationships among digital assets.

9. The method of claim 1 further comprising:
receiving from a first client device a first digital asset record representing a first digital asset, the first digital asset record comprising a first asset access permission field identifying a first asset access permission; and
receiving from the first client device a second digital asset record representing the first digital asset, the second digital asset record comprising the first asset access permission field identifying a second asset access permission;

replacing, promptly after receiving the second digital asset record, the first digital asset record with the second digital asset record;

whereby the asset access permission for the digital asset is changed in near real time from the first asset access permission to the second asset access permission.

10. The method of claim 1 further comprising editing a user access privilege field in a user record, whereby a user's user access privilege is changed in near real time.

11. The method of claim 1 wherein the computer is located in a first physical location, wherein the client devices Tirelessly coupled for data communications to the computer further comprise at least one of the client devices, located in a second physical location, wirelessly coupled for data communications through a second service gateway in the second physical location across an internet to a first service gateway located in the first physical location with the computer.

12. The method of claim 1 wherein the steps of creating a user group table and receiving digital asset records are carried out upon a staging computer and the steps of retrieving, displaying, and editing are carried out upon a project computer, the method comprising the further step of displaying on at least one computer display device of the staging computer the retrieved digital assets in their unedited form.

13. A system for ad hoc data sharing, the system comprising:
means for creating at least one user record representing a user granted access to digital assets, wherein:
- each user has a client device,
- at least two of the client devices are wirelessly coupled for data communications to at least one computer, and
- each user record comprises a user access privilege field identifying for each user that user's user access privilege for access to digital assets;

means for receiving from client devices digital asset records representing digital assets, each digital asset record comprising:
- at least one asset access permission field identifying a digital asset's asset access permission, and
- a location field identifying the location of a digital asset;

means for retrieving digital assets in dependence upon the location fields in the digital asset records;

means for displaying the retrieved digital assets; and means for editing one or more of the retrieved digital assets, wherein the editing is carried out in dependence upon user access privilege and in dependence upon asset access permission.

14. The system of claim 13 further comprising means for creating a group table, wherein the group table comprises at least one group record, the group record representing a user group, the group record comprising a group access privilege field and a foreign key field, wherein the foreign key field identifies a one-to-many relationship between the group table and one or more related user records in the user table, wherein the group access privilege field identifies access privileges for users represented by the related user records.

15. The system of claim 13 wherein the user access privilege comprises:
- a 'read' privilege denoting the right to retrieve a digital asset from a location identified in a digital asset record,
- a 'write' privilege denoting a right to edit a digital asset, and
- an 'execute' privilege denoting a right to store a digital asset in a storage location other than the location identified in the digital asset record.

16. The system of claim 13 wherein the client devices wirelessly coupled for data communications to the computer further comprise the client devices coupled for data communication wirelessly through a service gateway.

17. The system of claim 13 wherein the client devices wirelessly coupled for data communications to the computer comprises client devices coupled for data communications through a Bluetooth piconet.

18. The system of claim 13 wherein the client devices wirelessly coupled for data communications to the computer comprises client devices coupled for data communications through 802.11(b) connections.

19. The system of claim 13 wherein each user record further comprises:
- a user identification field identifying a user represented by a user record, and
- a user password.

20. The system of claim 13 wherein each digital asset record further comprises:
- a digital asset identification field,
- an owner identification field, and
- an asset relationship field identifying relationships among digital assets.

21. The system of claim 13 further comprising:
- means for receiving from a first client device a first digital asset record representing a first digital asset, the first digital asset record comprising a first asset access permission field identifying a first asset access permission; and
- means for receiving from the first client device a second digital asset record representing the first digital asset, the second digital asset record comprising the first asset access permission field identifying a second asset access permission;
- means for replacing, promptly after receiving the second digital asset record, the first digital asset record with the second digital asset record;
- whereby the asset access permission for the digital asset is changed in near real time from the first asset access permission to the second asset access permission.

22. The system of claim 13 further comprising means for editing a user access privilege field in a user record, whereby a user's user access privilege is changed in near real time.

23. The system of claim 13 wherein the computer is located in a first physical location, wherein the client devices wirelessly coupled for data communications to the computer further comprise at least one of the client devices, located in a second physical location, wirelessly coupled for data communications through a second service gateway in the second physical location across an internet to a first service gateway located in the first physical location with the computer.

24. The system of claim 13 wherein the means for creating a user group table and means for receiving digital asset records are carried out upon a staging computer and the means for retrieving, displaying, and editing are carried out upon a project computer, the system comprising the means for displaying on at least one computer display device of the staging computer the retrieved digital assets in their unedited form.

25. A computer program product for ad hoc data sharing, the computer program product comprising:
- a recording medium;
- means, recorded on the recording medium, for creating at least one user record representing a user granted access to digital assets, wherein:
  - each user has a client device,
  - at least two of the client devices are wirelessly coupled for data communications to at least one computer, and
  - each user record comprises a user access privilege field identifying for each user that user's user access privilege for access to digital assets;
- means, recorded on the recording medium, for receiving from client devices digital asset records representing digital assets, each digital asset record comprising:
  - at least one asset access permission field identifying a digital asset's asset access permission, and
  - a location field identifying the location of a digital asset;
- means, recorded on the recording medium, for retrieving digital assets in dependence upon the location fields in the digital asset records;
- means, recorded on the recording medium, for displaying the retrieved digital assets; and
- means, recorded on the recording medium, for editing one or more of the retrieved digital assets, wherein the editing is carried out in dependence upon user access privilege and in dependence upon asset access permission.

26. The computer program product of claim 25 further comprising means, recorded on the recording medium, for creating a group table, wherein the group table comprises at least one group record, the group record representing a user group, the group record comprising a group access privilege field and a foreign key field, wherein the foreign key field identifies a one-to-many relationship between the group table and one or more related user records in the user table, wherein the group access privilege field identifies access privileges for users represented by the related user records.

27. The computer program product of claim 25 wherein the user access privilege comprises:
- a 'read' privilege denoting the right to retrieve a digital asset from a location identified in a digital asset record,
- a 'write' privilege denoting a right to edit a digital asset, and
- an 'execute' privilege denoting a right to store a digital asset in a storage location other than the location identified in the digital asset record.

28. The computer program product of claim 25 wherein the client devices wirelessly coupled for data communications to the computer further comprise the client devices coupled for data communication wirelessly through a service gateway.

29. The computer program product of claim 25 wherein the client devices wirelessly coupled for data communications to the computer comprises client devices coupled for data communications through a Bluetooth piconet.

30. The computer program product of claim 25 wherein the client devices wirelessly coupled for data communications to the computer comprises client devices coupled for data communications through 802.11(b) connections.

31. The computer program product of claim 25 wherein each user record further comprises:
- a user identification field identifying a user represented by a user record, and
- a user password.

32. The computer program product of claim 25 wherein each digital asset record further comprises:
- a digital asset identification field,
- an owner identification field, and
- an asset relationship field identifying relationships among digital assets.

33. The computer program product of claim 25 further comprising:
- means, recorded on the recording medium, for receiving from a first client device a first digital asset record representing a first digital asset, the first digital asset record comprising a first asset access permission field identifying a first asset access permission; and
- means, recorded on the recording medium, for receiving from the first client device a second digital asset record representing the first digital asset, the second digital asset record comprising the first asset access permission field identifying a second asset access permission;
- means, recorded on the recording medium, for replacing, promptly after receiving the second digital asset record, the first digital asset record with the second digital asset record;
- whereby the asset access permission for the digital asset is changed in near real time from the first asset access permission to the second asset access permission.

34. The computer program product of claim 25 further comprising means, recorded on the recording medium, for editing a user access privilege field in a user record, whereby a user's user access privilege is changed in near real time.

35. The computer program product of claim 25 wherein the computer is located in a first physical location, wherein the client devices wirelessly coupled for data communications to the computer further comprise at least one of the client devices, located in a second physical location, wirelessly coupled for data communications through a second service gateway in the second physical location across an internet to a first service gateway located in the first physical location with the computer.

36. The computer program product of claim 25 wherein the means, recorded on the recording medium, for creating a user group table and means, recorded on the recording medium, for receiving digital asset records are carried out upon a staging computer and the means, recorded on the recording medium, for retrieving, displaying, and editing are carried out upon a project computer, the computer program product comprising the means, recorded on the recording medium, for displaying on at least one computer display device of the staging computer the retrieved digital assets in their unedited form.

37. A method of ad hoc data sharing for virtual team rooms, the method comprising the steps of:
- creating at least one user record in computer memory in a project computer, wherein:
  - each user record represents a user who is granted access to digital assets,
  - each user has a client device,
  - at least two of the client devices are wirelessly coupled for data communications to the project computer, and
  - each user record comprises a user access privilege field identifying for each user that user's user access privilege for access to digital assets;
- receiving, in the project computer from client devices, digital asset records representing digital assets, each digital asset record comprising:
  - at least one asset access permission field identifying a digital asset's asset access permission, and
  - a location field identifying the location of a digital asset;
- retrieving, into the project computer, in dependence upon the location fields in the digital asset records, digital assets;
- displaying on at least one computer display device of the project computer the retrieved digital assets, wherein the computer display device is in view of at least two of the users; and
- editing, through the project computer, one or more of the retrieved digital assets, wherein the editing is carried out in dependence upon user access privilege and in dependence upon asset access permission.

38. The method of claim 37 further comprising creating, wherein the group table comprises at least one group record, the group record representing a user group, the group record comprising a group access privilege field and a foreign key field, wherein the foreign key field identifies a one-to-many relationship between the group table and one or more related user records in the user table, wherein the group access privilege field identifies access privileges for users represented by the related user records.

39. The method of claim 37 wherein the user access privilege comprises:
- a 'read' privilege denoting the right to retrieve a digital asset from a location identified in a digital asset record,
- a 'write' privilege denoting a right to edit a digital asset, and
- an 'execute' privilege denoting a right to store a digital asset in a storage location other than the location identified in the digital asset record.

40. The method of claim 37 wherein the client devices wirelessly coupled for data communications to the project computer further comprise the client devices coupled for data communication wirelessly through a service gateway.

41. The method of claim 37 wherein the client devices wirelessly coupled for data communications to the project computer comprises client devices coupled for data communications through a Bluetooth piconet.

42. The method of claim 37 wherein the client devices wirelessly coupled for data communications to the project computer comprises client devices coupled for data communications through 802.11(b) connections.

43. The method of claim 37 wherein each user record further comprises:
- a user identification field identifying a user represented by a user record, and
- a user password.

44. The method of claim 37 wherein each digital asset record further comprises:
- a digital asset identification field,
- an owner identification field, and
- an asset relationship field identifying relationships among digital assets.

45. The method of claim 37 further comprising:
- receiving from a first client device a first digital asset record representing a first digital asset, the first digital asset record comprising a first asset access permission field identifying a first asset access permission; and
- receiving from the first client device a second digital asset record representing the first digital asset, the second digital asset record comprising the first asset access permission field identifying a second asset access permission;

replacing, promptly after receiving the second digital asset record, the first digital asset record with the second digital asset record;

whereby the asset access permission for the digital asset is changed in near real time from the first asset access permission to the second asset access permission.

46. The method of claim 37 further comprising editing a user access privilege field in a user record, whereby a user's user access privilege is changed in near real time.

47. The method of claim 37 wherein the project computer is located in a first physical location, wherein the client devices wirelessly coupled for data communications to the project computer further comprise at least one of the client devices, located in a second physical location, wirelessly coupled for data communications through a second service gateway in the second physical location across an internet to a first service gateway located in the first physical location with the project computer.

48. The method of claim 37 wherein the steps of creating a user group table and receiving digital asset records are carried out upon a staging computer and the steps of retrieving, displaying, and editing are carried out upon the project computer, the method comprising the further step of displaying on at least one computer display device of the staging computer the retrieved digital assets in their original and unedited form, wherein the computer display device of the second computer is in view of at least two of the users.

49. The method of claim 48 wherein the computer display devices comprise projectors and projection screens.

50. The method of claim 48 wherein the computer display devices comprise video displays.

* * * * *